Oct. 31, 1967  D. E. BAKER ET AL  3,349,438
APPARATUS FOR DIVIDING DOUGH AND LIKE MATERIALS
Filed Dec. 27, 1965  2 Sheets-Sheet 1

INVENTORS
DONALD ERNEST BAKER
WILLIAM GEORGE CULPIN
BY
THEIR ATTORNEYS

United States Patent Office 3,349,438
Patented Oct. 31, 1967

3,349,438
APPARATUS FOR DIVIDING DOUGH AND
LIKE MATERIALS
Donald Ernest Baker, Macclesfield, and William George Culpin, Stockport, England, assignors to The E. T. Oakes, Corporation, Islip, N.Y.
Filed Dec. 27, 1965, Ser. No. 516,259
Claims priority, application Great Britain, Dec. 30, 1964, 52,868/64
11 Claims. (Cl. 18—30)

ABSTRACT OF THE DISCLOSURE

The dough divider disclosed herein includes a series of cylinders movable successively into and out of communication with a nozzle through which dough and the like is extruded in a continuous stream, the cylinders each having a piston therein which is retracted as dough is extruded through the nozzle into the cylinder and by means of which the dough in the cylinder is ejected after the cylinder has been moved out of communication with the nozzle, the cylinders each being provided with a detecting means for detecting the complete filling of the cylinder with dough and controlling a drive mechanism by means of which a cylinder filled with dough is moved away from the nozzle and another cylinder is moved into communication with the nozzle, the cylinders also preferably including a detecting means for determining when the dough has been ejected from the cylinders and connected to the drive mechanism to control the movement of the cylinders into and out of communication with the nozzle.

Figure 1:
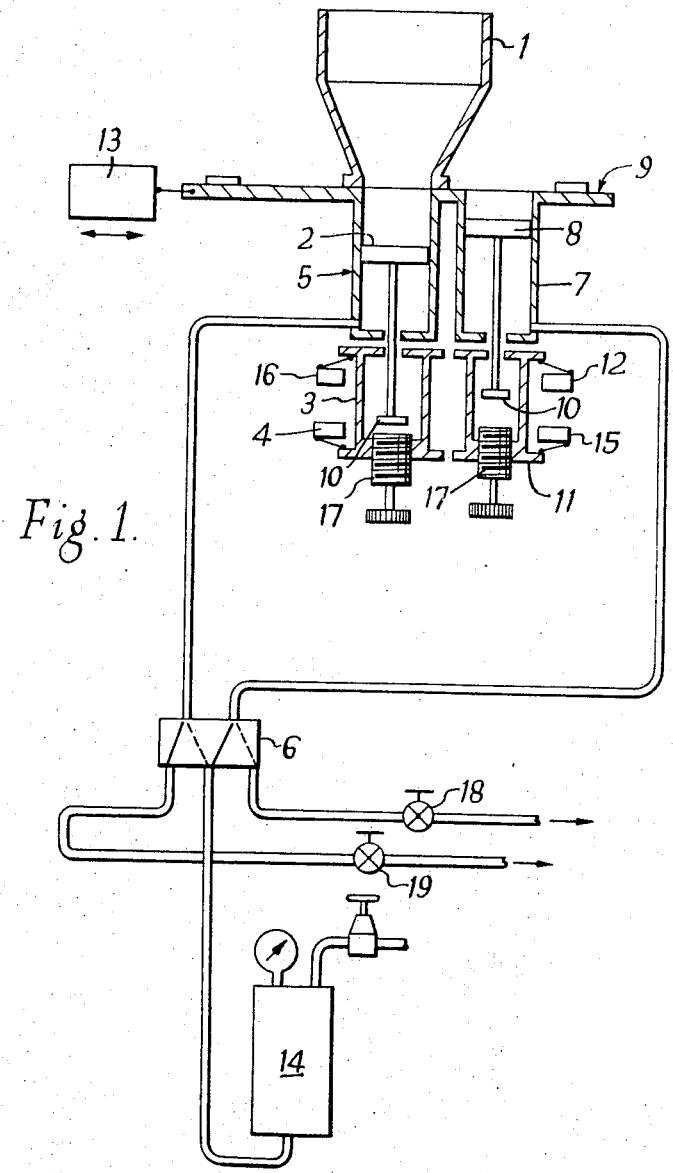

The present invention relates to apparatus for dividing a stream of dough or like material such as cake batter or synthetic plastics material in a soft condition. Although the invention has other uses, it is particularly applicable to the division of dough into pieces of predetermined volume.

In the past the majority of dough mixing machines have been batch mixing devices. The dividing equipment associated with these has of necessity been constructed to accept dough in bulk. These machines are heavy in construction and have a drastic mechanical action on the dough during the dividing process.

The advent of continuous dough mixers, and particularly those (for example as described in co-pending application Ser. No. 394,719 and continuation-in-part thereof Ser. No. 570,605) employing mechanical dough development to eliminate bulk fermentation, has presented a different problem for dough dividing equipment. In constructing such dividing equipment, two differences between batch and continuous mixing machines must be taken into account. Firstly, a continuous stream of dough is issuing from the continuous mixer, and secondly mechanically developed dough is more fragile than conventional dough and requires less harsh treatment.

In connection with the first aspect of continuous dough mixers, namely that a substantially continuous stream of dough must be divided, it has been found that small fluctuations in the amount of dough leaving the mixing device prevent the prior dividers from dividing the dough into equal pieces with the required accuracy and cannot be adjusted automatically to take account of variations in the throughput of the mixing device determined by the amount of dough required for baking.

With regard to the second aspect of continuous dough mixers, namely that the dough is particularly fragile, it is found that known devices for dividing doughs either effect a severe mechanical action on the dough, or subject it to a substantial pressure in the order of one atmosphere. In the case of the former there is a sudden compression of the dough which affects the texture of the baked piece, while in the case of the latter certain constitutents are driven into solution creating a sponge-like texture which is not generally acceptable.

Dividers of the type having cups or cylinders which contain pistons displaceable against a positive pressure to regulate filling, exert excessive pressure on the dough, since the pressure applied to the dough must be sufficient not only to ensure complete filling of the cup in register with the nozzle extension but also to effect ejection of dough from the other cup. Furthermore, since the rate of movement of the cup relative to the filling nozzle and the length of time that each cup remains stationary between successive movements depends solely on the speed of the driving shaft, there is no certainty that the dough-receiving cups will each be filled with an exactly predetermined volume of dough before being moved out of register with the nozzle extension. For example, any stoppage or substantial reduction in the rate of discharge of dough from the nozzle extension would result in empty or only partly filled dough-receiving cups being transferred to the positions where the ejection and dividing operations are performed.

According to the present invention there is provided an apparatus for dividing a stream of dough or like material into discrete pieces of predetermined volume, including dough-receiving cylinders to be brought successively into communication with a nozzle through which dough is discharged, and pistons in said cylinders which are pushed back by the entry of dough or the like into a cylinder and pushed forward to eject a divided piece of dough or the like after the cylinder is filled and moved away from the nozzle, and detecting means responsive to filling of the cylinder for moving the cylinders into and out of communication with the nozzle.

Preferably, the detecting means includes not only detecting means actuated by the pistons when they have been pressed back through a predetermined distance but also further detecting means actuated by the positions at the end of their return stroke and the motor is arranged to be set in operation only when the first-mentioned detecting means has been actuated by the piston in one cylinder when that cylinder has been filled with a predetermined quantity of dough or the like and the further detecting means has also been actuated by the piston in the other or another cylinder when that cylinder has a divided piece of dough or the like ejected therefrom.

It is an advantage of the invention that the division of the dough is triggered in response to a measurement of the volume of dough which has left the nozzle, rather than in response to a change of pressure, or to the passing of an interval of time. Thus, the accuracy with which the apparatus divides the dough into pieces of equal volume is unaffected by short term fluctuations in the output of the mixer, or by long term variations in the throughput of the mixer.

The dividing action of the apparatus can be arranged to be much gentler than in known dividers, and the time interval during which the flow from the mixer is interrupted can be made very small.

Apparatus embodying the invention is particularly applicable to mechanically developed doughs in which a deleterious effect on the texture of the dough would be caused either by application of high pressure (or by reduction of pressure), or by mechanical impact. The pressure exerted on the dough by each piston can moreover be controlled and can be arranged to be as little as 5 lbs./sq. inch.

Whilst the invention has particular advantage when used in conjunction with a continuous dough mixing device, it can also be successfully employed to divided batch doughs by the use of suitable feeding equipment.

In operation the apparatus is capable of dropping the dough pieces direct into tins for final proof (direct tinning), or passing the dough through conventional hander-up, interproof and moulding equipment, or passing the dough through the hander-upper along a conveyor to a moulder. Each of these methods will give a slightly different bread texture.

Figure 2:
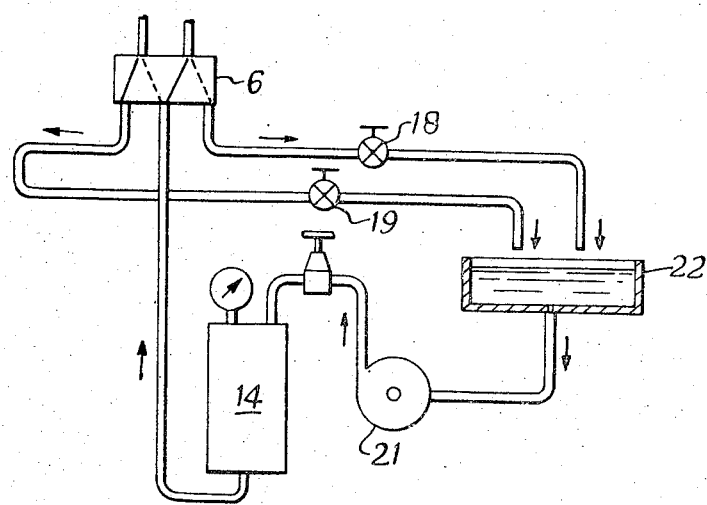

The invention will now be described by way of example with reference to the accompanying drawings, in which:

FIGURE 1 is a diagrammatic cross-sectional view of a preferred embodiment of the invention and FIGURE 2 is a diagrammatic view illustrating modifications incorporated in an alternative embodiment.

Like parts are indicated by the same reference numerals in FIGURES 1 and 2.

In the apparatus shown in FIGURE 1, two cylinders 5 and 7 are supported by a sliding plate 9 in such manner that each cylinder may be presented in turn to a nozzle 1 of an apparatus for the continuous production of dough. This apparatus may be of the type described in co-pending Application Ser. No. 394,719 and continuation-in-part application Ser. No. 570,605. In operation, a continuous stream of dough passes through the nozzle 1 and pushes back a piston 2 in the cylinder 5 until the piston reaches a preset, adjustable stop 17. This causes a slight movement of a spring-loaded, floating carriage 3. The movement is detected by an electrical microswitch 4 connected in a circuit including means driving a reciprocating cylinder 13.

While the dough is pushing the piston 2 back in the cylinder 5, air behind the piston is being discharged through a changeover valve 6 into the atmosphere.

At the same time that the dough is entering the cylinder 5, a piece of dough which has previously been divided from the stream leaving the nozzle 1 is being discharged from the second cylinder 7. Air at a predetermined pressure is fed from a reservoir 14 through the changeover valve 6 to the cylinder 7, and forces the piston 8 along the cylinder until the face of the piston is flush with the face of the sliding plate 9. When this position is reached, a collar 10 at the end of the piston rod remote from the piston 8 contacts a second floating carriage 11 causing it to move slightly in the opposite direction to that of the carriage 3. This slight movement is detected by a further electrical microswitch 12.

The two microswitches 4 and 12 are connected in series in a circuit including the means for driving the reciprocating cylinder 13. When both the microswitches are closed the electrical circuit is completed, causing the reciprocating cylinder 13 to move through one stroke taking the slider 9 with it and presenting the cylinder 7 to the nozzle 1. The said means for driving the cylinder 13 also causes the changeover valve 6 to operate in such a manner that the cylinder 7 is connected to the atmosphere and the cylinder 5 to the output of the reservoir 14.

Adjustable valves 18 and 19 provided in the exhaust connections from the changeover valve 6 enable the rate of discharge of air from behind the pistons 2 and 8 in the cylinders 5 and 7 respectively to be restricted and the pressure of the dough needed to operate the apparatus to be correspondingly increased. Thus, by adjusting the valves 18 and 19, the pressure of the dough in the nozzle 1 and hence in the dough-producing apparatus which discharges through this nozzle can be varied. By this means, the texture of the resulting bread can be controlled from an open and conventional texture at low dough pressures to an even texture with a small spherical cell of uniform size and distribution at high dough pressures.

The action of the slide 9 in moving to the new position in which the cylinder 7 is presented to the nozzle 1, causes the dough in the cylinder 5 to be divided from the dough in the nozzle 1. After the positions of the cylinders have been changed, the piston 2 begins to discharge the dough from the cylinder 5 and further dough begins to push back the piston 8 and fill the cylinder 7. The whole cycle is repeated using a further pair of microswitches 15 and 16.

The air passing from the reservoir 14 to eject the divided pieces of dough from the cylinders carries a fine spray of light edible mineral oil to lubricate the pistons and cylinders. This lubrication also assists in the ejection of the dough pieces from the cylinders as the cylinder walls are lightly wetted by the oil.

As an alternative, the electrical microswitches can be arranged merely to trigger the reciprocating cylinder 13 to operate, and the changeover valve 6 can be actuated by a timing device, by a further pair of microswitches, or by the movement of the slider 9 itself.

In an alternative construction of the invention, the parts of the cylinders behind the pistons are filled with the aforesaid edible oil, the connecting pipework also being so filled. A pump 21 (FIGURE 2) in the oil system provides the ejection pressure, and the changeover valve 6 connects one cylinder to the discharge side of the pump via the reservoir 14 and a control valve 22 and the other cylinder either to a sump 23 as shown in FIGURE 2 or to a tank of oil or to the suction side of the pump.

In a modification of the last-mentioned alternative construction, each cylinder is connected, during the ejection stroke, to the bottom of a pressure vessel individual thereto which is partially filled with the edible oil. The two discharge ports of the air changeover valve 6 are connected respectively to the tops of the two pressure vessels. The apparatus operates generally in the manner of the preferred embodiment.

In a variant of this last modification, the changeover valve is eliminated and fixed and constant pre-set air pressure is maintained in the top parts of both pressure vessels.

A further alternative to the preferred embodiment can be arranged by eliminating the air changeover valve 6 and maintaining a constant predetermined air pressure in both cylinders.

In yet a further modification of the preferred embodiment the two pistons can be coupled together either mechanically or hydraulically in such a manner that movement of one piston during a filling stroke causes the other piston to move in the opposite direction, thus ejecting the dough piece in that cylinder.

In all the embodiments referred to, the size of the dough pieces being divided can be adjusted by means of the adjustable stop 17. This can be carried out either while the machine is empty and stationary, or while the machine is running and discharging dough pieces.

An alternative sensing arrangement which eliminates the spring-loading can be arranged wherein the floating carriages 3 and 11 and the microswitches 4, 12, 15 and 16 can all be eliminated and replaced by electrical contacts. These contacts are closed at the end of each piston stroke, for example by the collar 10. Alternate pairs of these contacts could be connected in series and operated in a manner similar to that of the microswitches. The two pairs of contacts remote from the cylinders would be mounted on an adjustable mechanism, thus allowing the length of each stroke to be predetermined which in turn enables the volume of each dough piece to be predetermined.

While it is preferred to provide microswitches which only complete the circuit of the means for driving the reciprocating cylinder 13 when the cylinder presented to the nozzle 1 is full and the piston in the other cylinder has completed its ejection stroke, the apparatus could be simplified by connecting only one microswitch in the circuit of the means for driving the reciprocating cylinder, which microswitch could be arranged on a stationary mounting in a position to be actuated by projections on the floating carriages 3 and 11 when the corresponding cylinders 5 and 7 respectively are presented to nozzle 1 and have been filled with a predetermined volume of dough.

We claim:

1. Apparatus for dividing a stream of dough-like material into discrete pieces of predetermined volume comprising:

an extrusion nozzle for discharging said material, at least two cylinders arranged in spaced relationship for receiving the material discharged from said nozzle, a supporting member for said cylinders movable transversely across said nozzle to bring each cylinder in turn into a position in which it is presented to said nozzle and simultaneously to remove the previously presented cylinder from said nozzle, a motor drivably connected to said supporting member, means for severing material in each cylinder from material in the nozzle during the removal of said cylinder from said nozzle, pistons in said cylinders adapted, when the respective cylinders are presented to the nozzle, to be pressed back by the entry into the same of material from said nozzle, means for returning said pistons to eject material from the respective cylinders while said cylinders are removed from said nozzle, means for detecting when the piston in each cylinder presented to the nozzle has been pressed back through a predetermined distance, and means responsive to such detection by said detecting means to set said motor in operation for changing the cylinder presented to said nozzle.

2. Apparatus according to claim 1, wherein the severing means is constituted by cooperating edges of said nozzles and of said cylinders.

3. Apparatus according to claim 1, wherein the means for returning the pistons to eject dough-like material therefrom includes:

a source of fluid under pressure, a change-over valve operatively connected to the supporting member, a fluid-admission duct connecting said change-over valve to said source of fluid, fluid transfer ducts connecting said change-over valve to said cylinders on the sides of the pistons remote from the nozzle, fluid-exhaust ducting leading from said change-over valve, said change-over valve being adapted, while each cylinder is presented to the nozzle, to connect the respective fluid-transfer duct to the fluid-exhaust ducting and while each cylinder is removed from the nozzle, to connect the respective fluid-transfer duct to the fluid admission duct.

4. Apparatus as claimed in claim 1, wherein the means responsive to detection by the detecting means is electrically operated and the detecting means includes a microswitch connected in circuit with said electrical detection-responsive means and arranged to be actuated to close said circuit by the pressing back of a piston in a cylinder presented to the nozzle through a predetermined distance.

5. Apparatus as claimed in claim 4, and comprising in addition:

piston rods connected respectively at one of their ends to said pistons, floating members associated respectively with said piston rods, lost-motion connections between said floating members and the other ends of the associated piston rods, and adjustable stops provided on said floating members for adjusting the said predetermined distance by adjustment of the lost-motion in said lost-motion connections.

6. Apparatus for dividing a stream of dough-like material into discrete pieces of predetermined volume comprising:

an extrusion nozzle for discharging said material, at least two cylinders arranged in spaced relationship for receiving the material discharged from said nozzle, a supporting member for said cylinders movable transversely across said nozzle to bring each cylinder in turn into a position in which it is presented to said nozzle and simultaneously to remove the previously presented cylinder from said nozzle, a motor drivably connected to said supporting member, means for severing material in each cylinder from material in the nozzle during the removal of said cylinder from said nozzle, pistons in said cylinders adapted, when the respective cylinders are presented to the nozzle, to be pressed back by the entry into the same of material from said nozzle, means for returning said pistons to eject material from the respective cylinders while said cylinders are removed from said nozzle, first detecting means for detecting when the piston in each cylinder presented to the nozzle has been pressed back through a predetermined distance, second detecting means for detecting when the piston in each cylinder removed from the nozzle has completed its return stroke, and means responsive to operation of both said first and said second detecting means as a result of a piston in a cylinder presented to the nozzle having been pressed back through said predetermined distance and a piston in a cylinder removed from the nozzle having completed its return strike, to set said piston in operation for changing the cylinder presented to the nozzle.

7. Apparatus according to claim 6, wherein the severing means is constituted by cooperating edges of said nozzle and of said cylinders.

8. Apparatus according to claim 6, wherein the means for returning the pistons to eject dough-like material from the respective cylinders includes:

means for applying force to the piston in the return direction, and means for controlling the operation of said force-applying means in dependence upon the position of the supporting means so that said force-applying means is operatively connected thereby to each piston during at least part of the time that the respective cylinder is remove from the nozzle and is disconnected thereby from each piston throughout the time that the respective cylinder is presented to the nozzle.

9. Apparatus according to claim 6, wherein the means for returning the pistons to eject dough-like material therefrom includes:

a source of fluid under pressure, a change-over valve operatively connected to the supporting member, a fluid-admission duct connecting said change-over valve to said source of fluid, fluid transfer ducts connecting said change-over valve to said cylinders on the sides of the pistons remote from the nozzle, fluid-exhaust ducting leading from said change-over valve, said change-over valve being adapted, while each cylinder is presented to the nozzle, to connect the respective fluid-transfer duct to the fluid-transfer duct to the fluid-exhaust ducting and while each cylinder is removed from the nozzle, to connect the respective fluid-transfer duct to the fluid admission duct.

10. Apparatus as claimed in claim 6, wherein the means responsive to the detection by the detecting means is electrically operated and the first and second detecting means include microswitches connected in circuit with said electrial detection-respective means, each microswitch consituting a first detecting means associated with one cylinder being connected in series with a microswitch constituting a second detecting means associated with another cylinder.

11. Apparatus as claimed in claim 10, and comprising in addition:

piston rods connected respectively at one of their ends to said pistons, floating members associated respectively with said piston rods, lost-motion connections between said floating members and the other ends of the associated piston rods, adjustable stops provided on said floating members for adjusting the said predetermined distance by adjustment of the lost-motion in said lost-motion connections, said floating members each being arranged to actuate a microswitch constituting a first detecting member on being displaced by continued pressing back of the associated piston rod after the lost-motion has been taken up in one direction and to actuate a microswitch constituting a second detecting member on being displaced by continued return movement of the associated piston after the lost motion has been taken up in the other direction.

References Cited

UNITED STATES PATENTS

| | | | |
|---|---|---|---|
| 518,625 | 4/1884 | Pecht | 18—30 XR |
| 1,977,515 | 10/1934 | Klippel | 18—12 XR |
| 2,121,635 | 6/1938 | Knapp et al. | 18—30 XR |
| 2,371,709 | 3/1945 | Rineer | 18—12 |
| 2,375,955 | 5/1945 | Smith | 18—30 |
| 2,666,229 | 1/1954 | Vogt | 18—12 XR |

WILLIAM J. STEPHENSON, *Primary Examiner.*

UNITED STATES PATENT OFFICE

CERTIFICATE OF CORRECTION

Patent No. 3,349,438                      October 31, 1967

Donald Ernest Baker et al.

It is hereby certified that error appears in the above numbered patent requiring correction and that the said Letters Patent should read as corrected below.

Column 3, line 2, for "divided" read -- divide --; line 73, for "slide" read -- slider --; column 5, line 38, for "nozzles" read -- nozzle --; column 6, line 53, for "remove" read -- removed --; column 7, line 4, for "electrial detection-respectiv read -- electrical detection-responsive --.

Signed and sealed this 26th day of November 1968.

(SEAL)
Attest:

Edward M. Fletcher, Jr.                     EDWARD J. BRENNER
Attesting Officer                           Commissioner of Patents